No. 838,982. PATENTED DEC. 18, 1906.
A. GUIONNEAU.
HEAD MOTION.
APPLICATION FILED SEPT. 2, 1905.

Witnesses
Inventor
Abel Guionneau,
By Victor J. Evans,
Attorney

UNITED STATES PATENT OFFICE.

ABEL GUIONNEAU, OF DENVER, COLORADO.

HEAD-MOTION.

No. 838,982.  Specification of Letters Patent.  Patented Dec. 18, 1906.

Application filed September 2, 1905. Serial No. 276,816.

*To all whom it may concern:*

Be it known that I, ABEL GUIONNEAU, a citizen of the United States, residing at Denver, in the county of Denver and State of Colorado, have invented new and useful Improvements in Head-Motions, of which the following is a specification.

The invention relates to an improvement in head-motions designed particularly for use in connection with concentrating-tables or similar devices, wherein it is essential that a reciprocating motion be imparted to the table.

The main object of the present invention is the production of means adapted in operation to impart to the table an absolutely uniform accelerated motion during the forward stroke and uniformly-retarded motion during the return stroke, whereby to materially increase the efficiency and results of the table.

The invention will be described in detail in the following specification with particular reference to the accompanying drawings, wherein—

Figure 1:
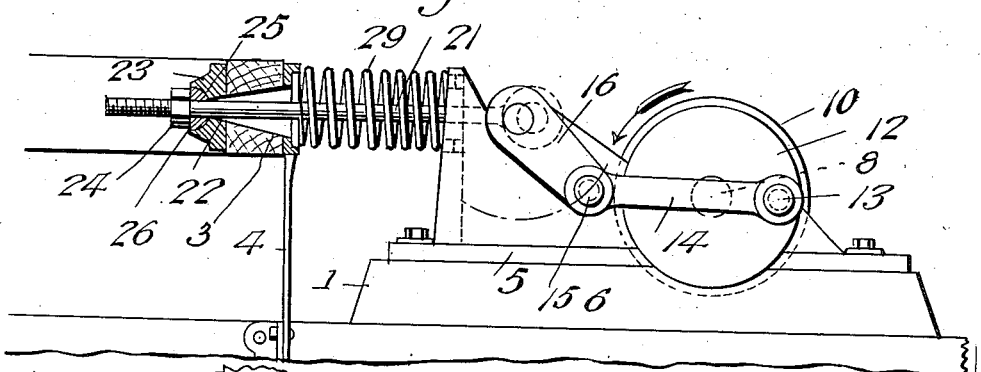
Figure 2:
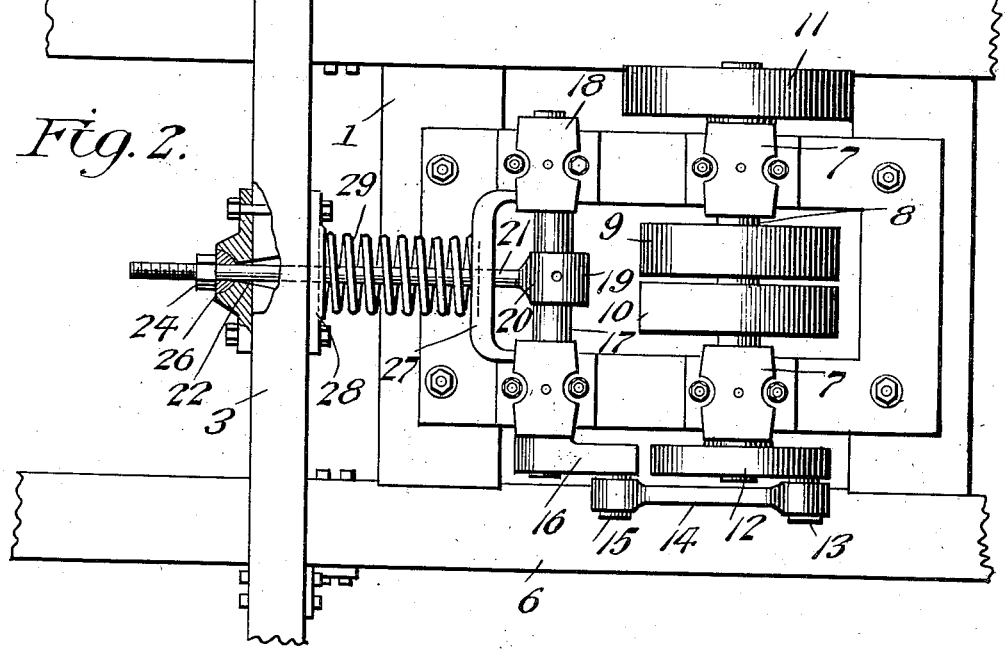

Figure 1 is a view in side elevation illustrating my improved head-motion as applied to the table of a concentrator. Fig. 2 is a plan view of the same.

Referring to the drawings, 1 represents the foundation-timbers underlying the whole structure, and 2 the concentrating-table, the end cross-bar 3 of which is connected with the foundation-timbers by suitable springs 4, as is usual. It is to be understood that the head-motion of my improvement is designed for use with any concentrating-table and that the illustration herewith is intended to show a table of ordinary construction without regard to details, as such forms no material part of the present invention. The head-motion proper comprises a base-plate 5, suitably supported on stringers 6, mounted on the foundation-timbers. Transversely-alined bearings 7 are fixed on the base-plate and support a main shaft 8, which centrally between the bearings is provided with a fast-and-loose pulley 9 and 10 and at one end with a fly-wheel 11, all of which parts may be of any preferred construction. The end of the shaft opposite the fly-wheel is provided with a crank-wheel 12, to the crank-pin 13 of which is fixed an arm 14, projecting toward the table and secured to the crank-pin 15 of a crank 16. The crank 16 is mounted on one end of a crank-shaft 17, supported in bearings 18, mounted on the base-plate immediately contiguous the forward end of the table. The central portion of the shaft, or that portion between the bearings 18, is offset to provide a crank 19, to which is movably connected, through the medium of a collar 20, a rod 21, the forward end of which passes loosely through an opening 22, formed in a bearing-plate 23, secured to the cross-bar 3 of the table. The inner or free end of the rod 21 is threaded to receive the adjusting-nut 24, and the opening in the bearing-plate 23 adjacent the free end of the rod is cut out to form a semispherical depression 25, in which is seated a semispherical bearing-block 26, centrally cored to permit passage therethrough of the rod 21. A U-shaped frame 27 is fixedly secured to bearings 18, the cross-arm of the frame extending from one bearing to the other and being positioned in a plane forward of said bearings—that is, nearer the table 2. A bearing-plate 28 is secured to the cross-bar 3 of the table in alinement and on the side opposite the bearing-plate 23, said plate 28 being formed with a central opening to permit passage of the rod 21, it being understood that, as usual, the opening for the rod formed from the plates 28, the cross-bar 3 of the table-frame, and the bearing-plate 23 is of cone shape, with the base thereof next the operating parts of the device, whereby, in conjunction with the semispherical bearing-block 26, the rod 21 is permitted a certain degree of lateral movement. A coil-spring 29 encircles the rod 21, bearing at one end against the bearing-frame 27 and at the opposite end against the bearing-plate 28, this spring serving to take up all lost motion in operation and materially assist in the reciprocating movement imparted to the table.

In operation revolution of the main shaft 8 will, through the arm 14 and crank 16, impart a reciprocating movement to the rod 21, thereby communicating the said movement to the table 2. As the rod is freely movable through the opening in the table in one direction, it will be evident that the spring 29, which has been put under tension in the forward movement of the rod, will operate to cause the reverse movement of the table, and in this reverse movement the rod 21 acts to retard the operation.

From the construction described it will be noted that by means of the rod 21, in conjunction with the spring 29, an absolutely uniformly accelerated motion during the forward stroke and a uniformly-retarded motion during the return stroke will be imparted to the table, as the rod 21 operates to draw the table in one direction against the movement of the spring, and the spring 29 operates to force the table in the opposite direction against the retarding movement of the rod. As the rod is uniformly driven by the crank-shaft 19, it follows that the movement of the table will be uniform and that the transfer of the table from one phase of movement to the other will be practically cushioned by the effect of the spring 29.

The structure described is readily adapted for use with all concentrating-tables and may be quickly and conveniently connected with the same without interfering in the least with the table structure.

Having thus fully described my invention, what I claim as new, and desire to secure by Letters Patent, is—

The combination with a spring-supported concentrating-table including an end cross-bar, of a head-motion therefor comprising a base-plate arranged in advance of the table, a crank-shaft supported on the base-plate, a drive-shaft mounted on the base-plate in advance of the crank-shaft, means connecting the drive-shaft and crank-shaft to rock the latter in the revolution of the former, a bearing-frame fixedly secured to the crank-shaft bearing, an operating-rod projecting through said frame and extending in an unbroken length through one of the cross-bars of the table, said rod being connected at one end with the crank-shaft and being threaded at the opposite end, a bearing-plate secured to the table cross-bar to receive the end of the operating-rod, said plate being formed with a semispherical depression in alinement with the operating-rod opening therethrough, a semispherical block mounted in said depression and formed with an opening to permit the passage of the operating-rod, a nut engaging the threaded end of the rod and bearing against the block, a wear-plate secured to the cross-bar and formed with an opening to permit passage of the operating-rod, bolts passing through the wear-plate, cross-bar, and bearing-plate, the wall of the operating-rod opening through the wear-plate, cross-bar, and bearing-plate diverging toward the crank-shaft, and a spring encircling the operating-rod and bearing at one end against the wear-plate and at the opposite end against the bearing-frame.

In testimony whereof I affix my signature in presence of two witnesses

ABEL GUIONNEAU.

Witnesses:
CHARLES A. BRADLEY,
JOHN H. GALLUP.